United States Patent [19]

Bengtsson

[11] Patent Number: 4,881,572

[45] Date of Patent: Nov. 21, 1989

[54] SYSTEM FOR CONTROLLING AUTOMATICALLY THE SETTING OF A DAMPER IN A VENTILATION DUCT

[75] Inventor: Lars-Erik Bengtsson, Saltsjö Duvnäs, Sweden

[73] Assignee: Stifab AB, Tomelilla, Sweden

[21] Appl. No.: 176,641

[22] Filed: Apr. 1, 1988

[30] Foreign Application Priority Data

Apr. 3, 1987 [SE] Sweden .............................. 8701398

[51] Int. Cl.⁴ .............................................. G05D 16/00
[52] U.S. Cl. .................................. 137/488; 137/487.5; 137/492
[58] Field of Search ............ 137/489, 491, 488, 487.5, 137/492

[56] References Cited

U.S. PATENT DOCUMENTS

| | | | |
|---|---|---|---|
| 651,927 | 6/1900 | Marsh | 137/489 |
| 967,702 | 8/1910 | Anderson | 137/491 X |
| 2,896,850 | 7/1959 | Ashley | 137/489 X |
| 3,047,010 | 7/1962 | Rothfuss | 137/489 |

FOREIGN PATENT DOCUMENTS 0128690  5/1984 European Pat. Off. .
0186559 12/1985 European Pat. Off. .
7213608 10/1972 Sweden .

Primary Examiner—Alan Cohan
Attorney, Agent, or Firm—Nils H. Ljungman

[57] ABSTRACT

The invention relates to a control system for adjusting the setting of a damper (9) in a ventilation duct (8) and maintaining a substantially constant pressure at a selected region in the ventilation duct, the system comprising a cylinder (1) having a vertical cylinder axis and housing a readily movable, pressure-responsive device (2), which together with the cylinder defines a pressure space. The pressure space (22) communicates with the ventilation duct at the aforementioned selected region, and drive means (11, 12) are provided for adjusting the damper setting in response to the position of the pressure-responsive device, so as to maintain a constant pressure. The inventive system is characterized in that the pressure-sensitive device (2) has a mass which corresponds to a selected pressure at the aforementioned region in the duct and is intended to balance the pressure force acting on the device.

2 Claims, 4 Drawing Sheets

SYSTEM FOR CONTROLLING AUTOMATICALLY THE SETTING OF A DAMPER IN A VENTILATION DUCT

The present invention relates to a system intended for controlling automatically the setting of a damper in a ventilation duct.

Control systems of this general kind have not found wide use in the ventilation field, mainly because they are particularly imprecise and thus have a poor control function, unless made prohibitively expensive.

Consequently, the systems used today are mainly systems which incorporate manually adjusted dampers, and in which the dampers are set to positions in which the calculated and desired pressure drop is obtained. One problem encountered with such systems is that subsequent to ascertaining that the air flow to a particular location or room is correct, or at least lies within acceptable tolerance limits, a subsequent adjustment to the damper function in a ventilation duct which serves a different location or room will result in a change in the damper setting of the first mentioned location. This manual adjustment of the dampers of each individual location or room is therefore particularly time consuming and, in practice, it is extremely seldom that the air flow to each separate location or room has the desired value.

The undesirable air vents or openings which are found in buildings between the various locations, rooms, etc., therein and between the different floors of the building also constitute a problem when using ventilation systems which incorporate manually adjustable dampers, not least because of the energy losses that are experienced and because e.g., smoke is able to spread freely throughout the building in the event of a fire.

Attempts have been made to control the damper setting automatically, by utilizing the pressure drop across the damper blade in order to establish a constant air flow, wherewith springs and counterweights are used in co-action with the damper blade to this end. The forces which act on the damper blade in response to a pressure drop across the blade are, however, generally too small to adjust the damper setting satisfactorily.

The object of the present invention is therefore to provide a damper control system which will overcome the problems experienced with known systems of this kind, and which despite being of simple construction will afford a particularly accurate control function and which is able to adapt readily to the ventilation requirements of each particular location or room served by the system. These objects are realized by a damper control system which has the characteristic features set forth in the following claims. The invention will now be described in more detail with reference to a number of exemplifying embodiments thereof and with reference to the accompanying drawings, in which FIG. 1 illustrates an exemplifying damper control system according to the invention, in which the damper is operated pneumatically in a system which operates at pressures above atmospheric or ambient pressure;

Figure 1:
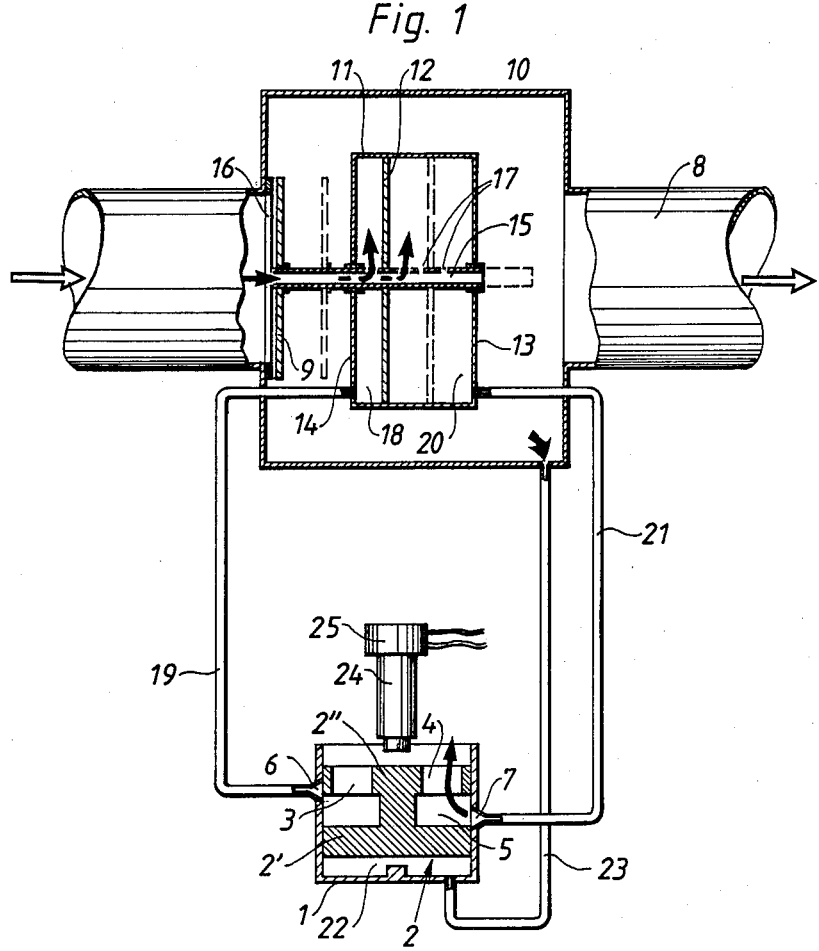

The illustrative embodiment of FIG. 1 includes a control cylinder or float-chamber 1 in which a float device, or pressure-responsive device, generally referenced 2, is intended to move freely in the direction of the vertical axis of the cylinder. The float device, which moves freely in the cylinder, comprises two cylindrical parts 2' and 2" which are spaced axially, at a given distance apart. The upper float part 2" of the float device 2 has provided therein at least one fluid out flow port, in the illustrated case two ports referenced 3 and 4, each of which communicates with an annular space 5 defined between the mutually opposing surfaces of respective float parts 2' and 2". Provided in the wall of the control cylinder 1 is a first aperture 6 and a second aperture 7 which can be placed in communication with the flow channels formed by the space 5 and the ports 3 and 4, in a manner hereinafter described. It will be seen from FIG. 1 that the first aperture 6 is spaced axially from the second aperture 7, the distance between said apertures being a pre-determined distance. The float device 2 has a mass which corresponds to the pressure desired in an outlet channel or duct 8 which leads, e.g., to a selected office or office location.

The duct 8 has arranged therein a damper 9 which is intended to regulate or control the flow of air entering the illustrated duct from a main air-supply duct (not shown), this main duct supplying air to a plurality of ventilation ducts 8, each of which serves a respective office or office location, with the aid of a fan or blower (not shown), wherein the pressure in the main supply duct is held constant or at least substantially constant. In the illustrated state of the control system, the damper 9 is only slightly open, such that the flow of air to the duct 8 will correspond to the amount of air desired, i.e. such that the pressure prevailing in the duct 8 is the pressure desired. The illustrated duct 8 also has arranged therein a damper control means 10 which, in the case of the illustrated embodiment, comprises a cylindrical housing 11 and an air-impermeable piston or diaphragm 12 which is housed in the housing 11 and which seals, or essentially seals, against the inner wall surface of the cylindrical housing 11 and which is securely mounted on a hollow shaft 15 which extends through both end walls 13 and 14 of the housing 11, said housing being shown in a shortened view. The damper 9 is carried on one end of the hollow shaft 15, i.e. the left end in FIG. 1, and will abut a seating 16 when the shaft 15 is moved to the left to its fullest extent. The interior of the hollow shaft 15 communicates with the duct part located to the left of the damper 9, i.e. with the main air-supply duct.

The hollow shaft 15 has provided therein ventilation apertures which are located on respective sides of the air-impermeable piston 12, such as the illustrated apertures 17, so as to establish mutually the same pressure in the cylinder spaces or chambers on either side of the piston 12 when the system is in a balanced state, as hereinafter described, this cylinder pressure being, of course, equal to the pressure prevailing to the left of a damper in FIG. 1 The left-hand chamber 18 defined by the piston 12 and the cylinder 11 communicates with the aperture 6 in the cylinder 1, via a pipe 19, whereas the right-hand chamber of the damper control means 10 communicates with the aperture 7 in the cylinder 1 via a pipe 21. The bottom cylinder space 22 defined between the mutually opposing surfaces of the lower float part 2' and the cylinder bottom is connected to the duct 8 through a pipe 23, and the pressure acting on the two major surfaces of the "weighted" float device which face towards the space 22 will therefore correspond to the pressure in the duct 8.

FIG. 1 illustrates the ventilation system in a state of balance, i.e. the pressure in the duct 8 and therewith the volume of air flowing into the ventilated location per unit of time correspond to desired values. As beforementioned, this pressure is, in turn, contingent on the mass of the float device 2. The pressure prevailing in the duct 8, which is the desired pressure, is transmitted through the pipe 23 to the bottom space 22 of the cylinder 1, and acts on the bottom surface of the float part 2' with a force which is determined by said pressure and by the surface area of said float part, and which consequently holds the float device 2 suspended on a cushion of air. As illustrated in FIG. 1, in the balanced state of the system the aperture 6 is held partially closed by the plunger part 2" and the aperture 7 is also held partially closed by the plunger 2', i.e. the air which is fed to the interior of the hollow shaft 15 from the main air-supply duct and which flows into the chambers 17 and 18 is passed to the surroundings through the pipes 19 and 21, the annular space 5 and the outlet ports 3 and 4, and consequently the pressure that prevails on either side of the piston 12 will be standard atmospheric pressure, provided that the piston 12 and the damper 9 remain in their illustrated set positions.

If the pressure in the main supply duct (not shown) should fall, i.e. on the left of the damper 9 in FIG. 1, the pressure on the right-hand side of the damper will, of course, also fall. Consequently, the pressure in the cylindrical bottom space 22 of the cylinder 1 will also fall and therewith exert a smaller force on the float device 2, which will subsequently be lowered in the cylinder 1. As the float device 2 is lowered in the cylinder 1, the outlet aperture 6 is closed fully and the left-hand chamber 18 in the cylindrical housing 11 will no longer be ventilated, wherewith the pressure in the chamber rises. Since this lowering of the float device 2 will simultaneously expose the whole of the outlet aperture 7 located axially beneath the aperture 6, the right-hand chamber 17 will be ventilated to the surroundings and the piston 12 and the damper 9 carried thereby will be moved to the right in FIG. 1. As a result of the subsequent increase in free space between the damper 9 and the seating 16, the volume of air which flows into the duct 8 will also increase and cause the pressure to rise in the duct part located to the right of the damper 9, as seen in the Figure. This increase in pressure is transmitted to the bottom space 22 in the cylinder 1, through the pipe 23, therewith lifting the float device 2. As the float device rises, it will partially uncover the opening 6, therewith establishing equilibrium between the pressure prevailing on both sides of the piston 12, whereupon movement of the damper ceases. The system has thus been brought to a new state of equilibrium or balance, and the pressure prevailing in the duct 8 is again the pressure desired, despite the lower pressure in the main air-supply duct. It will be understood that the pressure in the duct 8 may also fall, for instance as a result of opening a window in the location served by said duct. The system will also be restored, in this case, to a state of equilibrium, however, in the same manner as that just described.

Should the "buoyancy pressure" in the bottom space 22 increase, i.e. the pressure in the duct 8 increases above a desired value, the float device 2 will be lifted in the cylinder 1 and the float part 2' will begin to close the aperture 7. When this aperture is closed completely, or at least throttled to an extent such that no air flows through the pipe 21 or such that the air flow in said pipe is significantly smaller than the unimpeded air flow in the pipe 19, the pressure in the left-hand chamber 18 in the cylinder 11 will be lower than the pressure in the right-hand chamber 20 and the piston 12 will be moved to the left in FIG. 1, wherewith the damper 9 will move closer to its seating 16 and subsequently reduce the amount of air that can flow into the duct 8. The pressure will thus fall in the duct 8 and the float device will subsequently be lowered in the cylinder 1 and begin to close the aperture 6 progressively, while exposing the aperture 7, until the desired equilibrium or balanced state is achieved.

In order to ensure that the damper 9 will close when the fan or blower associated with the main air-supply system is stopped automatically, e.g. in the event of a fire, a thrust spring may be arranged between the damper 9 and the housing 11. When the pressure ceases in response to the fan being switched off, or rendered inoperative in some other way, and the pressure in the duct thus falls to atmospheric or ambient pressure, the spring will urge the damper 9 against its seating 16.

Although not shown in FIG. 1, the float device 2 is preferably provided with a metal screw which forms a taring weight, so that with the aid of an appropriate screw the float device can be given a total mass which corresponds to the desired pressure for the duct to be controlled or regulated. Obviously, other kinds of taring weights can be used.

The described system can also be used to design a so-called variable air volume system, which implies that the air supplied to a room or some other location from a so-called hygiene-air flow can be increased to a cooling air flow. A cooling air flow is required when a room becomes overheated due, for instance, to the presence of a large number of people therein. This cooling function of the system can be achieved, for instance, by the provision of an electromagnet 24 which is controlled by a room thermostat 25. In this case, the float device 2 is provided with a ferromagnetic body which, when the electromagnet 25 is energised by the thermostat 25, draws the float device 2 upwards to a terminal position in which the damper 9 is practically closed and in which a suitable air flow is engendered from an hygienic aspect. The thermostat 25 is set to a desired maximum temperature, and when this temperature is reached the thermostat will break the current to the electromagnet 24 and the float device 2 will begin the function and set the system to the pressure determined by the mass of the float device 2, so that a maximum air flow is introduced into the room.

Figure 2:
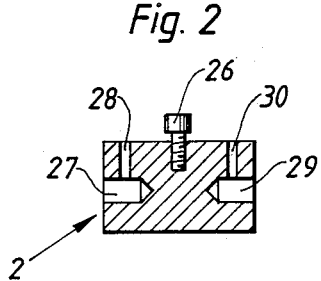
FIG. 2 illustrates a modified float or like pressure-responsive device for use in the control system illustrated in FIG. 1.

FIG. 2 illustrates schematically and in section a float device 2 whose mass can be varied by means of an exchangeable taring screw 26. In this case, the throughflow channels 5-3 of the FIG. 1 embodiment are formed by a bore 27 which is ventilated through a passageway 28, whereas the throughflow channels 5-4 of the FIG. 1 embodiment are formed by a bore 29 and a passageway 30. As distinct from the float device of the FIG. 1 embodiment, the float device illustrated in FIG. 2 requires the provision of guide means to prevent rotation of the device about its vertical axis. Rotation of the float device may result in blockaging of the apertures 6 and 7 in FIG. 1.

Figure 3:
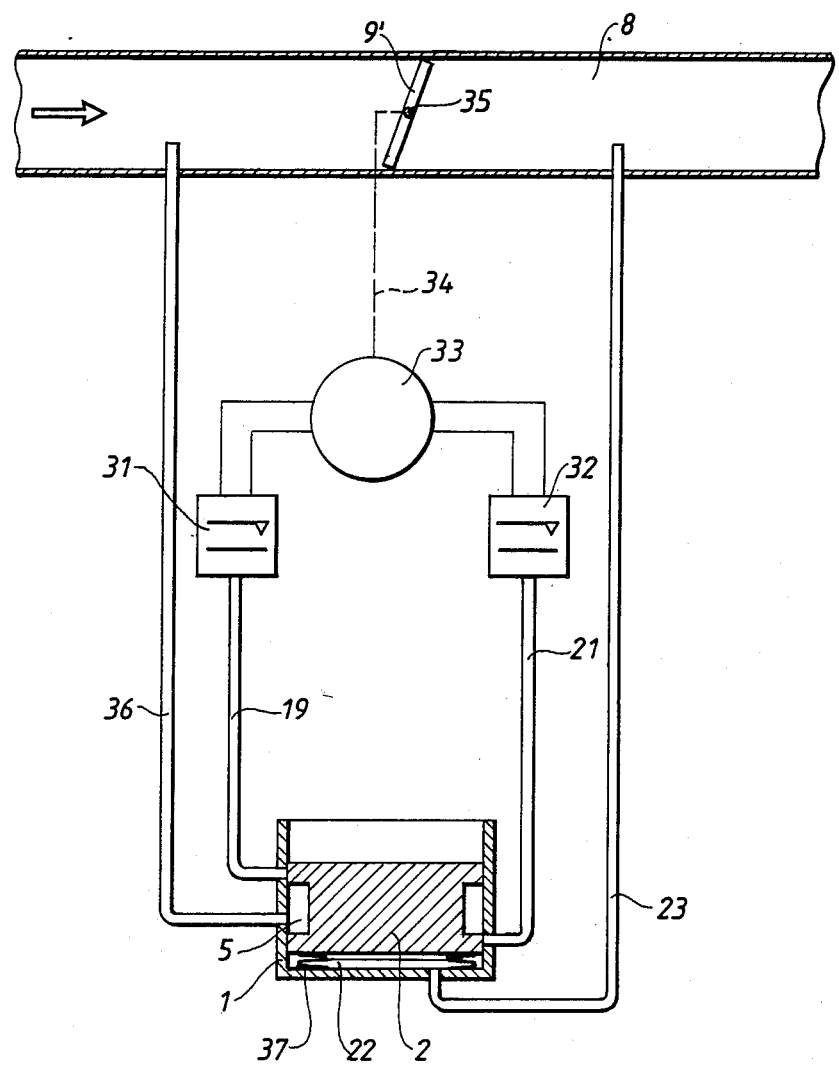
FIG. 3 illustrates a control system similar to that illustrated in FIG. 1 but in which the damper is operated pneumatically and electrically.

FIG. 3 illustrates an embodiment in which the damper-driving motor 11, 12, 18, 20 of the FIG. 1 embodiment is replaced with an electric motor 33 which is controlled via pressure switches 31 and 32. The motor 33 is connected to the rotational shaft 35 of a damper by means of a suitable transmission arrangement or shaft 34, indicated in broken lines, and is intended to rotate the damper 9' in the duct 8 for the purpose of adjusting the flow of air through said duct.

The control system of the FIG. 3 embodiment is, in principle, identical with the control system illustrated in FIG. 1, and thus includes a float device 2 which exhibits an annular space 5 and moves vertically in a cylinder 1. As with the aforedescribed embodiment, the pressure in the duct 8 downstream of the damper 9' is transmitted to the bottom surface of the float device 2, via a pipe 23, and control pressure is transmitted, via the aforedescribed pipe 19, to a pressure-control switch 31, which when activated closes an electric circuit to the motor 3 and causes said motor to rotate the damper 9' anticlockwise from the position illustrated in FIG. 3, therewith to reduce the flow of air through the duct 8 and also to reduce the pressure downstream of the damper 9', and permit the float device 2 to sink in the cylinder 1 and close-off the pipe 19. If the pressure in the duct 8 downstream of the damper 9', as seen in the direction of air flow, falls to a value beneath the value determined by the mass of the float device 2, the float device will sink to a lowest level and the orifice of pipe 21 in the cylinder wall will be exposed at the same time as the orifice of pipe 19 will be covered, wherewith the pressure-responsive switch 32 is activated and starts the motor 33 in the damper opening direction, i.e. the damper 9' is swung clockwise around its axle 35 until the duct pressure downstream of the damper 9' has been re-set to the value determined by the mass of the float device 2. The drive pressure delivered to the two switches 31 and 32 is obtained via a pipe 36, which delivers air to the annular space 5 at a pressure corresponding to the air pressure upstream of the damper 9' as seen in the direction of air flow. It will be understood, however, that this drive air can also be taken out downstream of the damper 9'.

As will be understood, the friction between the float device 2 and the wall of the cylinder 1 shall be as small as possible, although the float device should seal sufficiently against the cylinder wall to prevent the pressure-indicating air supplied through the pipe 23 from disturbing the air flow through, for instance, the pipe 36. It may therefore be suitable to enclose the bottom space or pressure chamber 22 in a bellows-like device 37 or the like which is sealingly connected to the bottom surface of the lower float part and to the bottom of the cylinder 1, and which is made of an extremely thin rubber material or the like which will not appreciably affect the mass of the float device 2 or engender forces which will influence movement of said float device in the cylinder 1.

Figure 4:
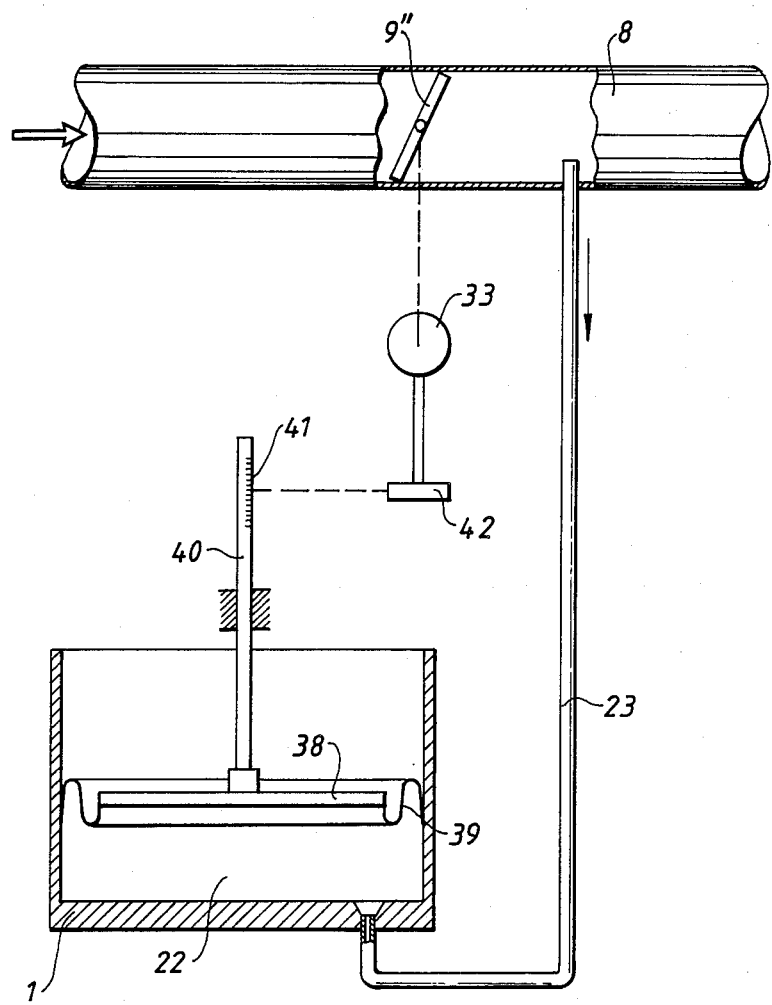
FIG. 4 illustrates a control system in which the pressure-responsive device has the form of a diaphragm.

FIG. 4 illustrates a modified damper control system which includes a cylinder or float housing 1 which has a pressure-responsive device or float 38 arranged therein. The float device 38 comprises, for instance, a sheet of plastics material or metal and is connected sealingly to the inner wall surface of the cylinder 1, by means of an essentially frictionless and lightweight bellows structure or diaphragm 39, and is able to move essentially frictionless within the cylinder and without being hindered in its movements by the diaphragm 39. The float device 38, which is disc-shaped in the case of the illustrated embodiment, has fitted thereto an exchangeable central rod or taring device 40 which together with the disc 38 determines the mass of the float device. Thus, the disc 38 and the diaphragm 39 form therebeneath an air-tight pressure chamber or bottom space 22 which communicates, via the aforedescribed pipe 23, with the duct 8 at a point downstream of the damper 9" as seen in the direction of air flow. The pressure prevailing in the duct downstream of the damper 9" will therewith also prevail in the bottom space 22 of cylinder 1 and, when the float device is in a state of equilibrium it will take a determined position. In this equilibrium state, the mass of the float device, including the tare 40, balances the upwardly directed force determined by the pressure prevailing in the bottom space 22 and the active area, i.e. the pressure-receiving surface, of the disc 38. When, for instance, the duct pressure downstream of the damper 9" increases, the upwardly directed force will exceed the downwardly acting force, determined by the mass of the disc and the taring device, and the float device will rise in the cylinder 1. An electronic sensor 42 is intended to sense the upward movement of the rod or the taring device 40, and also the magnitude of said movement, by reading off, e.g., a scale 41 on the rod 40, and sends, in response to said reading, control signals to the electric motor 33, which may, e.g., have the form of a stepping motor. As previously described with reference to FIG. 3, the motor 33 in this case will rotate the damper 9" in an anticlockwise direction in FIG. 4, so as to reduce the duct pressure downstream of the damper 9" and permit the float device to adopt the position determined by the mass of said device and, of course, also its pressure-receiving surface. Since the mass of the float device is changed when the taring device 40 is changed, whereas the pressure-receiving surface of the disc 38 remains unchanged, each taring device or rod 40 can be labeled with the pressure it affords. This sensing of the movement of the float device, or the pressure-responsive body, can also be applied to the float device 2 of the FIG. 1 embodiment.

Figure 5:
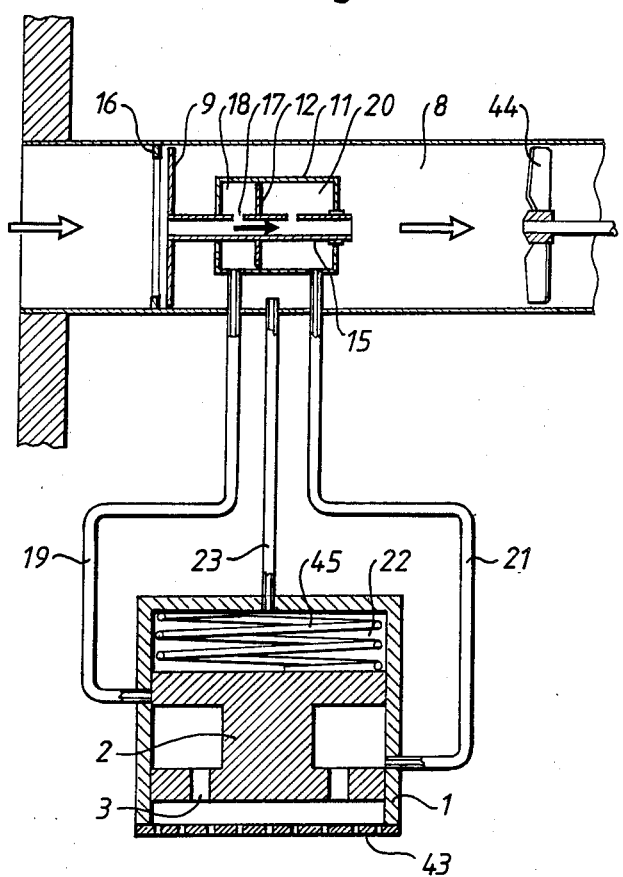
FIG. 5 illustrates a control system which operates at pressures beneath atmospheric or ambient pressure.

The described damper control system can also be used in conjunction with subpressure systems. FIG. 5 illustrates one such system, intended to measure the subpressure relative to atmospheric pressure in an evacuation duct. Those components found in the FIG. 1 embodiment have been identified with the same reference marks in FIG. 5.

The cylinder 1 of the FIG. 4 embodiment has a bottom, perforated surface or net 43, the sole purpose of which is to prevent the float device 2 from falling from the cylinder 1 should the subpressure generated by an evacuation fan 44 in the duct 8 disappear because the fan 44 stops, whereupon the pressure in the duct 8 will be equal to atmospheric pressure. The duct 8, with the aid of the fan 44, withdraws consumed air from a room or some other location lying to the left of the Figure. The damper 9 co-acts with its seating 16 and is carried by a hollow shaft 15 having openings 17 on both sides of a piston 12. In this case, the shaft 15 is open towards the fan 44, and consequently when air is drawn through the duct 8 by the fan, a region of subpressure is created relative to atmosphere. This subpressure is transmitted through the pipe 23 to the space or chamber defined between the float 2 and the closed end of the cylinder 1.

The subpressure creates a lifting force on the float device, the magnitude of which force depends on the magnitude of the float surface facing the space 22. When this lifting force corresponds to the mass of the float device 2, the float device will be held suspended or floating in the cylinder. Should the subpressure diminish, i.e. approach atmospheric pressure, the float device 2 will fall in the cylinder 1 and in doing so open the pipe 19 leading to the space 22 and to the interior of the housing 11, at the same time as the pipe 21 is open or is opened towards the housing 11. The pipe 21, which communicates with atmosphere through the ports 3, thus imparts to the chamber 20 to the right of the piston 12 a pressure (atmospheric pressure) which is higher than the pressure prevailing in the chamber 17 on the left of the piston 12, and therewith the damper 9 will be closed still further and the duct pressure will fall, whereupon the float device is drawn upwards to its position in which the system is again in balance.

If, on the other hand, the subpressure should increase above the value determined by the mass of the float device 2, the float device 2 will be drawn upwards and close the pipe 21 and open the pipe 19, this latter pipe therewith being placed in communication with atmosphere through the ports 3. The pressure in the chamber 17 is therewith brought to atmospheric pressure, whereas the pressure in the chamber 26 is brought to the subpressure value prevailing in the duct 8. As a result, the damper 9 will be moved to the right in FIG. 5, such as to reduce the subpressure in the duct 8 and cause the float device to return towards a balanced position, or to return fully to a balanced position. It will be understood that a subpressure control system according to FIG. 5 can also be used to activate other types of drive arrangements, for example those drive arrangements described with reference to FIGS. 3 and 4.

It may also be convenient to provide a damping spring between the float device and the cylinder, as indicated at 45 in FIG. 5, therewith preventing the float device from striking the bottom of the cylinder 1 in the event of abrupt changes in pressure. This spring will preferably not exert any tension or pressure on the float when the device is in its balanced position, its floating position, although a certain degree of influence on the float device can be tolerated, the mass of the float device preferably being corrected to a corresponding degree.

I claim:

1. A control system for setting the position of a damper in a ventilation duct and maintaining a substantially constant pressure at a selected region downstream of said damper in the ventilation duct, said system comprising a double acting pilot valve having:
   a vertically oriented cylinder and housing;
   a readily movable, pressure-responsive piston device which rides on air in the cylinder and which together with the cylinder defines a pressure space, which communicates directly with the ventilation duct at said selected region;
   said cylinder having two control orifices being disposed for being selectively obstructed by said piston device;
   said pressure responsive piston device being disposed for vertical movement in said vertically oriented cylinder, said piston having two surfaces for selectively obstructing said two control orifices;
   one of said two control orifices being disposed in said vertically oriented cylinder for being obstructed by said pressure responsive piston device on upward movement thereof; and
   the other of said two control orifices being disposed in said vertically oriented cylinder for being obstructed by said pressure responsive piston device on downward movement thereof;
   said two control orifices comprising a first and second control orifice;
   said system further comprising drive means being connected to said damper for driving said damper and thus for opening and closing said damper;
   said drive means being for adjusting the damper setting in response to movement of said pressure-responsive piston device, such as to maintain said pressure, wherein the pressure-responsive device has a mass which corresponds to a selected pressure at said region in the duct, and is intended when in a floating position in the cylinder to balance the force acting on the side of said device which faces the pressure space with said selected pressure;
   said drive means comprising:
   a double acting drive cylinder;
   a double acting drive piston having two sides being disposed in said double acting drive cylinder;
   a first and a second chamber being diposed one on each side of said double acting drive piston;
   means for admitting a gas under pressure to each of said chambers on either side of said drive piston;
   a first conduit connected between said first of said control orifices of said double acting pilot valve and second of said two chambers of said drive piston;
   a second conduit connected between said second of said control orifices of said double acting pilot valve and said second of said two chambers of said drive piston;
   said first and said second conduits being connected for adjusting the damper to a position in which the pilot valve piston device is returned to a balance position thereof;
   the piston of the drive means and the damper being adjustable, in dependence on a position of imbalance of said piston device of said pilot valve by pressure control in the chambers to adjust the damper to a position in which the pilot piston device is returned to a balance position determined by the mass of said pilot piston device.

2. A system according to claim 1 wherein the pressure-responsive device comprises a float device (2) slidable in the cylinder (1).

* * * * *